US012679140B2

(12) United States Patent
Kolar

(10) Patent No.: US 12,679,140 B2
(45) Date of Patent: Jul. 14, 2026

(54) TWO-WAY BAND BRAKE FOR A CASTER

(71) Applicant: Linet Spol. S R.O., Slany (CZ)

(72) Inventor: Vladimir Kolar, Slany (CZ)

(73) Assignee: Linet Spol. S R.O., Slany (CZ)

( * ) Notice: Subject to any disclaimer, the term of this patent is extended or adjusted under 35 U.S.C. 154(b) by 709 days.

(21) Appl. No.: 17/997,224

(22) PCT Filed: May 4, 2021

(86) PCT No.: PCT/CZ2021/000017
§ 371 (c)(1),
(2) Date: Oct. 26, 2022

(87) PCT Pub. No.: WO2021/223782
PCT Pub. Date: Nov. 11, 2021

(65) Prior Publication Data
US 2023/0182506 A1    Jun. 15, 2023

(30) Foreign Application Priority Data

May 6, 2020    (CZ) ................................ CZ2020-250

(51) Int. Cl.
*B60B 33/00*        (2006.01)
*A61G 7/08*        (2006.01)
*F16D 49/10*        (2006.01)

(52) U.S. Cl.
CPC ............ *B60B 33/0078* (2013.01); *A61G 7/08* (2013.01); *F16D 49/10* (2013.01)

(58) Field of Classification Search
CPC .............. B60B 33/021; B60B 33/0057; B60B 33/0068; B60B 33/0094; B60B 2200/242;
(Continued)

(56) References Cited

U.S. PATENT DOCUMENTS 505,066 A * 9/1893 Shaw ................ H01L 21/67706
212/84
757,480 A * 4/1904 Middleton .............. F16D 49/10
188/77 R
(Continued)

FOREIGN PATENT DOCUMENTS

CN        101586304 B  *  7/2012
CN        205631958 U  *  10/2016
(Continued)

OTHER PUBLICATIONS

JP H09250570 A Sep. 22, 1997 (Year: 1997).*
(Continued)

*Primary Examiner* — Nicholas J Lane
*Assistant Examiner* — Mahbubur Rashid
(74) *Attorney, Agent, or Firm* — Thedford I. Hitaffer; Hitaffer, PLLC

(57)        ABSTRACT
A mechanical two-way controlled band brake has components, such as a lever, a yoke having arms and a guiding bar, a brake band, anchoring points, pivots and brake drums, which are preferably made of metal or metal alloys. The components of the mechanical two-way controlled band brake may be also made of other materials, such as plastics, combination of metal alloys and plastics or any other materials, which are firm with sufficient bearing capacity.

10 Claims, 3 Drawing Sheets

(58) Field of Classification Search
CPC . B60B 33/0078; F16D 2125/64; F16D 49/00;
F16D 49/08; F16D 49/10; A61G 7/08
See application file for complete search history.

(56) References Cited

U.S. PATENT DOCUMENTS

| | | | | | |
|---|---|---|---|---|---|
| 946,057 | A | * | 1/1910 | Riaymend | F16D 49/10 |
| | | | | | 188/77 R |
| 958,446 | A | * | 5/1910 | Vanderbreek | F16D 49/10 |
| | | | | | 188/77 R |
| 977,744 | A | * | 12/1910 | Ikelley | F16D 49/10 |
| | | | | | 188/77 R |
| 1,022,639 | A | * | 4/1912 | Frank | F16D 49/10 |
| | | | | | 188/77 R |
| 1,646,335 | A | * | 10/1927 | Woodruff | F16D 49/10 |
| | | | | | 188/194 |
| 1,904,530 | A | * | 4/1933 | Rathbun | |
| 2,709,506 | A | * | 5/1955 | Cilley | F16D 49/10 |
| | | | | | 188/77 R |
| 3,159,865 | A | * | 12/1964 | Shepherd | B60B 33/06 |
| | | | | | 16/35 R |
| 6,219,881 | B1 | | 4/2001 | Wen | |
| 2014/0000989 | A1 | * | 1/2014 | Lai | A45C 5/145 |
| | | | | | 188/69 |

FOREIGN PATENT DOCUMENTS

| | | | | | |
|---|---|---|---|---|---|
| CS | 274126 | B1 | * | 4/1991 | |
| EP | 2050584 | A1 | * | 4/2009 | B60B 33/0039 |
| EP | 2301764 | A1 | | 3/2011 | |
| JP | H09250570 | A | | 9/1997 | |
| WO | WO-2009157132 | A1 | * | 12/2009 | B60B 33/0005 |

OTHER PUBLICATIONS

European Patent Office, International Search Report, mailed Oct. 18, 2021, in International Patent Application No. PCT/CZ2021/000017, filed May 4, 2021.
European Patent Office, Written Opinion, mailed Oct. 18, 2021, in International Patent Application No. PCT/CZ2021/000017, filed May 4, 2021.

* cited by examiner

TWO-WAY BAND BRAKE FOR A CASTER

CROSS-REFERENCE TO RELATED APPLICATIONS

This application, filed under 35 USC 371, is a United States National Stage Application of International Application No. PCT/CZ2021/000017, filed May 4, 2021, which claims priority to CZ Application No. PV 2020-250, filed on May 6, 2020, the disclosures of which are incorporated herein by reference in their entirety.

TECHNICAL FIELD

A technical solution describes a braking mechanism of casters used with patient support apparatuses in hospitals, health care and nursing care facilities or settings comprising a two-way band brake that enables free motion of patient support apparatus casters after being unlocked. The braking mechanism presented herein brakes any caster of the patient support apparatus in both directions of rotation.

PRIOR ART

The technical solution described in this document can be used with any bed, particularly patient support apparatuses in hospitals, health care and nursing care facilities or settings, which have a brake and four and more casters, or with beds having a brake and driven or guiding wheels fixed to the basic frame and being able to rotate around horizontal and vertical axis to move the bed from one place to another.

Falls constitute a big problem in term of medical, economic and social aspects as they cause extensive complications and have serious consequences. Huge number of falls is in particular caused by unbraked bed or patient support apparatus. A consequence of unbraked patient support apparatus may be a situation when the patient support apparatus moves under the patient and subsequent fall of a patient causes injury that prolongs suffering of the patient and complicated the overall treatment.

Falls in hospital facilities and particularly nursery facilities and settings are more common and represent the most risky unpredictable event that endangers elderly people and chronically ill patients. According to statistics, the risk of fall is more probable with persons above 65 years. In each case falls endanger patients causing very often useless haematomas, gaping wounds and fractures, also fractures of upper part of femur bone that may have sometimes fatal complications.

The above mentioned falls have also, inter alia, economic impacts on hospital and nursery facilities. A patient suffering from dangerous fall needs to undergo another examinations, X-ray examination or surgery. Such injuries extend hospitalization and increase demands on caregiving staff. In some cases, hospital and nursery facilities may face legal suits initiated by patients and their relatives.

Conventional hospital beds have four or five casters. All such casters work with only three positions of turning of the hexagon nut in the central caster control system—position BRAKED, position FREE and position GUIDED RIDE. One of the casters has a hollow or projection on the component that turns around the vertical axis together with the caster so that the caster is complementarily attached directly or indirectly to the frame so that in case of interlocking of the projection into the hollow the caster cannot turn around the vertical axis. This is a principle of a groove on the caster axis and controllable latch on the frame of patient support apparatus. Controlling of the latch is provided either mechanically by means of a spring and a Bowden cable fixed to the latch, or in another mechanical way, by a lever or a button controlled by foot.

The above described means that the existing mechanisms of central caster control systems use mostly pressure brakes with pedals that are mutually interconnected. Such brake system is usually located above the caster itself which increases the height of the caster. The caster height further influences the height of the frame of the patient support apparatus and thus the height of the patient support deck in its lowest safe position. In case we need to have the lowest safe position of the patient support deck we need to minimize casters. By minimizing casters the patient support deck may go down lower into the safe position, however, a patient support apparatus with such minimized casters has lower bearing capacity and is difficult to be operated and manipulated with if a patient lies on it.

With respect to this fact the existing used casters have a default (standard) size which is directly proportional to the size of a patient support apparatus and its bearing capacity. These brake systems with brake mechanisms located above casters increase the height of patient support apparatuses and in case of positioning the patient support apparatus into the lowest safe position such patient support apparatus is still in the risk height of 25 cm above the ground. Such height means an injury risk for a patient when falling down from the patient support apparatus.

The system of band brake is well known. A band brake comprises a band coiled around a wheel or a brake drum and causes friction which protects the wheel from turning at all (static brake), or it slows the wheel down (dynamic brake). Band brakes are often used with static equipment and devices—funicular machine rooms, cranes, power saws, and different types of tractors or winches. Disadvantage of this existing type of band brakes is that such band brakes may brake wheels or casters which move only in one direction of rotation of such wheel or caster. That is also the reason why this type of brake is not used with hospital or nursery support apparatuses as such support apparatuses need to be moved forward and backward and casters must rotate in both directions. In this regard, the existing type of band brake is inconvenient for hospital or nursery support apparatuses.

SUMMARY OF THE INVENTION

The above mentioned substantial insufficiencies of the existing known band brakes are solved by presented two-way band brake. Casters having this two-way band brake are defined to be used particularly with hospital or nursery support apparatuses. In the preferred embodiment, such type of casters may be used with other types of furniture which need to be transported from place A to the place B. Two-way band brake of a caster presented in this patent application improves the existing conventional band brake so that it could be used with casters that rotate in two directions, which was not possible so far.

Another advantage of the two-way controlled band brake presented herein is a possibility to decrease the height of a patient support apparatus into the lowest possible position when keeping the standard size of a caster. The key element of this newly invented braking system is that the braking mechanism conventionally located above the caster was moved directly inside the caster. It enables to lower the height of a patient support deck by the height of location of conventional braking mechanism above the caster.

The caster presented in this patent application comprises a braking mechanism of caster located inside the inner space of the caster which is fixed on the lateral edge of a fork (i.e. carrying member) into which a two-way band brake system of the caster is attached to.

The stated caster comprises a vertical axis pivot which comprises a control member located on the top side of the vertical axis pivot. A fork (or carrying member) is fixed to the vertical axis pivot. The fork comprises guiding bar of a yoke and also a support of a spring located under the guiding bar of a yoke. A lever of a spring support fits the yoke at least in one point, and this lever of the spring support is fixed to the fork in one point and is in contact with the control member of the caster. The yoke of the two-way controlled band brake is symmetrical and fixed into the fork (carrying member) by at least one anchoring point. In the preferred embodiment the yoke is fixed to the fork (carrying member) by two fixing or anchoring points which fits into the guiding bar of the yoke and which are located on the fork (carrying member). The guiding bar of the yoke is preferably part of the fork (carrying member) but can be provided also in a form of an external member fixed to the fork (carrying member). The guiding bar of the yoke comprises at least one yoke slot, preferably the guiding bar of the yoke comprises two yoke slots—a slot A and a slot B.

The yoke of the two-way controlled band brake is created as one unit with at least one anchoring point, preferably, the yoke comprises anchoring points at each end of the yoke. Optionally, the symmetrical yoke may comprise at least two arms for fixing the yoke and at least two arms for fixing and bearing the brake band. Each arm of the solution presented herein comprises one symmetrical yoke operating for both directions of rotation of the caster. The symmetrical yoke comprises at least one anchoring point, preferably there are at least two anchoring points in the shape of T at each arm, or such anchoring points are formed as projections coming out from the arms of yoke into each side to form pairs. The yoke of the two-way controlled band brake comprises at least one anchoring point for fixing the brake band at each opposite end of the yoke. Preferably, this anchoring point on the yoke may be a pin which protrudes from the yoke to both sides.

In the preferred embodiment, the brake band is fixed on the yoke by lugs (or loops) on the anchoring points of the yoke. Due to the fact that the brake band must form a stripping loop around the drum, the brake band is fixed on the anchoring points of the symmetrical yoke at least on one side from the inside of the yoke and on the other side the brake band is fixed outside the yoke so that the brake band could form the stripping loop around the drum. Preferably the brake band is metal but may be also provided in the form of a metal wire, a wire made of different materials such as metal alloy or plastics, or a rope. In the presented embodiment the brake band is made of metal spring plate. The band may be flat to obtain better braking effects but optionally can be oval or rounded.

In the preferred embodiment the brake band fits close the inner brake drum of the caster. The inner brake drum of the caster is a part of the caster but may be also coupled with the caster externally. The inner brake drum of the caster is coupled with the fork by a swivel pin together with the caster. The inner brake drum is a part of the caster and is braked by the brake band which fits close around it. The brake drum can be made of metal of plastic material, or metal alloys, or mixed of metal and plastic materials.

The yoke that bears the brake band and that is movably fixed to the fork in the yoke slots by at least two anchoring points also bears on the support of the fork. The guiding bar of the yoke on the fork comprises two openings in which anchoring points, which enable rotation movement of the yoke, are located. The anchoring points can be thereby also called as pivots. Movement of yoke in the guiding bar of the fork is enabled thanks to free anchoring by anchoring points, lever of a spring support and a spring. The spring can be a metal spring or any other elastic material as for example rubber. The spring is located between the yoke body and the support on the fork. The yoke changes its position based on the fact if any force is developed on the lever of the spring support which is coupled to the control member in one end and in the other end it bears on the yoke. When the lever is pressed to the yoke, the yoke changes position and thus the brake band around the brake drum is released and the caster is unbraked. To release the brake band around caster centre the lever must push on the yoke. By releasing the caster the position of the yoke is changed so that the yoke is in level and does not lean to any side. Brake band around the brake drum is released and the caster can rotate free around axis of rotation in random direction.

The change of yoke position has a substantial impact for braking by two-way controlled band brake. When releasing the external lever force on the yoke, the brake band shrinks around the brake drum by means of the spring. The spring does not develop sufficient force to brake the brake drum of the caster during the first phase. When releasing the lever to the yoke, the yoke leans and bears into the guiding bar of the yoke according to direction of rotation of the caster and thus force starts to develop according to lever ratio which consequently shrinks the brake band around the brake drum a the caster is braked. Change of yoke position is enabled due to symmetry of the yoke. By changing the direction of yoke into the other side the caster can be braked also during opposite direction of ride. In case of pressing the lever onto the yoke the anchoring points get closer to the caster centre and the brake band around the brake drum releases which enables to unbrake (release) the caster which then can move free in both directions of rotation.

LIST OF DRAWINGS

The FIG. 1 shows side elevation of a cross section of a caster with two-way controlled band brake.

EXEMPLARY EMBODIMENTS OF THE INVENTION

Figure 1:
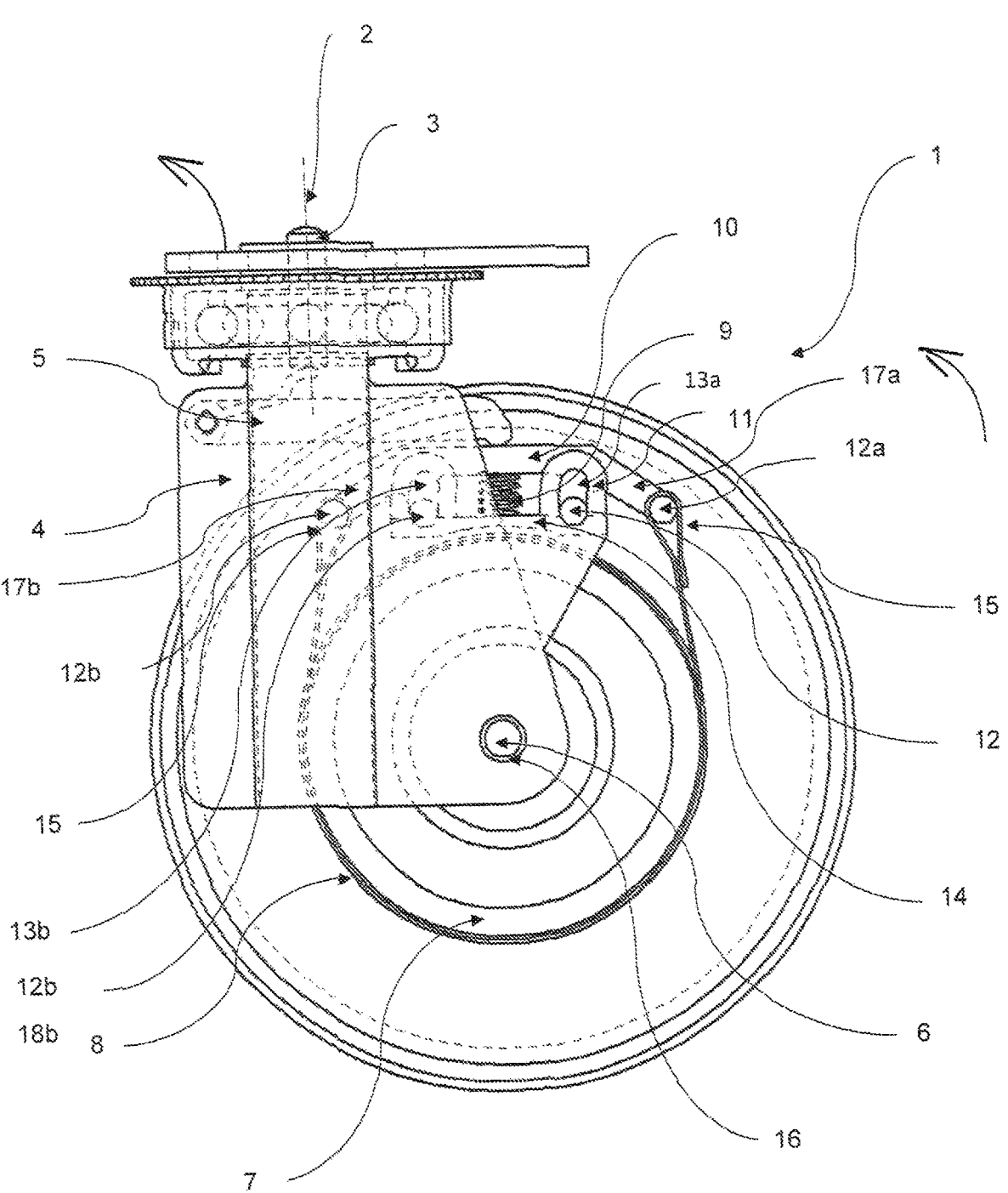

FIG. 1 shows a caster 1. Preferably, this caster may be used with beds, hospital and nursery support apparatuses, tables, side tables, counters, trolleys or any other type of furniture that needs to be moved from place A to the place B. Hospital and nursery facilities and setting need to handle patient support apparatuses empty or with patients due to necessary transport from one part of such facility to another, transport to examine a patient etc. The hospital and nursery facilities and settings are not shown on the FIG. 1.

FIG. 1 shows side elevation of a cross section of a caster 1 with two-way controlled band brake. The two-way controlled band brake comprises a caster 1 with inner brake drum 7. The caster 1 with the brake drum 7 is fixed to a fork

4 using swivel pin 6 and via opening 16 for swivel pin 6. The brake drum 7 is twined around by brake band 8, which is terminated in each end by a lug 15 for attaching the brake band 8 to the symmetric yoke 10 of the two-way controlled band brake. It means that the brake band 8 has two lugs 15. At least one lug 15 is fixed to at least one external anchoring point 12a of the yoke 10 and at least one lug 15 is fixed to the anchoring point 12b of the yoke 10. The yoke 10 of the two-way controlled band brake is formed, in the preferred embodiment, as one symmetrical unit which has in each end at least one anchoring point 12. Optionally, the yoke 10 can be formed from several parts: body of the yoke 10 and four arms 17 that may be divided into two long arms 17a and 17b terminated with anchoring points 12a and 12b. These arms 17a and 17b are bearing arms for brake band 8 whose anchoring lugs 15 are fixed to the arms on anchoring points 12a and 12b. The second pair of arms comprises short arms 17c and 17d which are terminated by anchoring points 12 in the end but after fixing into the yoke slots 13a and 13b in the guiding bar 11 of the yoke they shall be defined hereinafter as pivots 18a and 18b. This pair of short arms 17c and 17d with pivots 18a and 18b serve as bearing arms for fixing the yoke 10 in the guiding bar 11 of the yoke which comprises two yoke slots 13a and 13b and a support 14 where the yoke 10 is free fixed to the fork 4. In parallel, free supporting of the yoke 10 enables free movement of the yoke 10 in yoke slot 13a by means of pivots 18a and 18b, or in yoke slot 18b on the fork 4 by means of a spring 8 that is located under the yoke 10 between the pivots 18a and 18b. The spring 9 bears on the support 14 of the fork 4. In the preferred embodiment, the guiding bar j of the yoke 10 with yoke slots 13a and 182 and the support 14 for the spring 8 are parts of the fork 4 (carrying member). Optionally, the guiding bar 11 of the yoke 10 with yoke slots 13a and 13b and the support 14 for the spring 2 fixed to the fork 4 as an external component by nuts or screws.

The FIG. 1 also shows that the caster 1 comprises vertical axis pivot 2 and a fork 4 (carrying member). A control member 8 which controls a lever of a spring support 5 goes through the vertical axis pivot 2. The lever 5 is controlled by a control member 2 in one end and in another end the lever 5 bears on the yoke 10 by which the two-way band brake is controlled. By releasing the lever 5 bearing onto the symmetrical yoke 10 the yoke 10 changes its position and the brake band 8 shrinks around the brake drum 7 by which the caster 1 is braked. Position of yoke 10 and shrinking of the brake band 8 around the brake drum 7 change in consequence of direction in which the caster 1 moves. When braking the caster 1 the lever 5 releases onto the yoke 12 and the brake band 8 shrinks around the brake drum 7. Thus the caster 1 is stopped and turning around axis of rotation in random direction is limited. The change of yoke 10 position upon releasing the lever 5 onto the yoke 10 and change of direction of rotation of the brake drum 7 have a substantial impact for braking by two-way controlled band brake.

When changing the position of the symmetrical yoke 10 upon releasing external force of lever 5 onto the yoke 10 the brake band 8 shrinks around the drum by means of a spring 9. When the caster 1 moves in the first phase, the spring 9 does not develop sufficient force to brake the brake drum 7 of the caster 1. At the moment the lever 5 is released onto the yoke 10, the yoke 12 leans and bears on the guiding bar 11 of the yoke according to direction of caster rotation and thus force is developed which consequently shrinks the brake band 8 around the brake drum 7 which brakes the caster 1. Change of position of the yoke 10 is enabled by symmetry of the yoke 10 therewith that the yoke 10 changes position into the opposite direction of ride By changing position of the yoke 10 into the opposite side the caster 1 may be braked even during opposite direction of ride. During this change of position of the yoke 10 at least one anchoring point 2 in the guiding bar 11 of the yoke is in the distant position from the caster centre and one anchoring point 11 or pivot 18a or 18b, comes closer to the caster centre by which the brake band 8 is shrunk around the drum 7. This change is caused by transferring the external force of the lever 5 onto the yoke 10 by means of spring 9 which is located between the pivots 18a and 18b.

The caster 1 is unbraked when the brake band 8 releases. This happens at the moment of pressing the lever 5 onto the yoke 12 by which the anchoring points 12 and the yoke 1 come closer to the centre of the caster 1. If the yoke 10 is in such position, the brake band 8 remains free and the brake drum 7 of the caster 1 can rotate free in any direction, it means forward or backward, from left to right.

Figure 2:
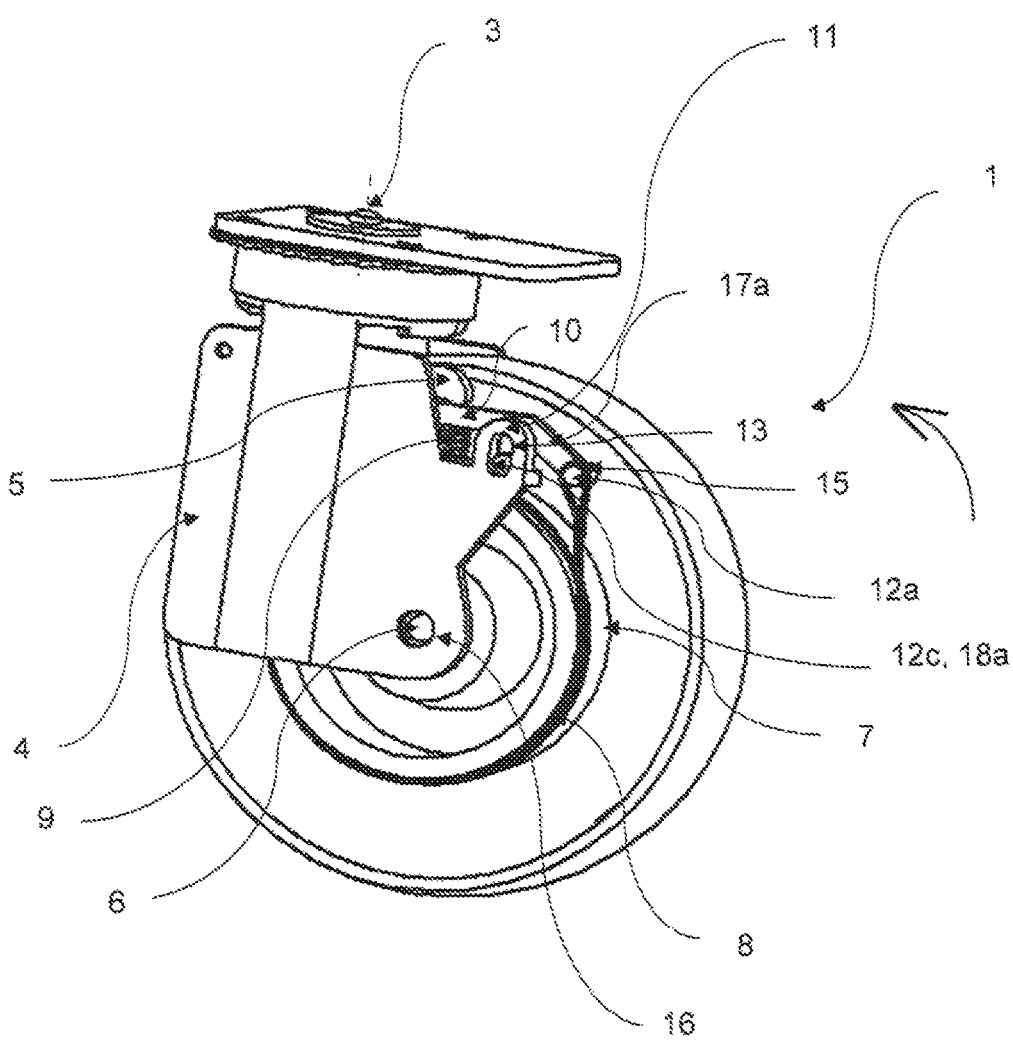
FIG. 2 shows axonometric projection of a caster with open view of the caster showing the visible part of the two-way controlled band brake.

The FIG. 2 shows the axonometric side elevation with open part of the caster 1 with visible brake drum 7 which encircles the brake band 8. The brake band 8 is fixed to at least one anchoring point 12a of the symmetrical yoke 10 by lugs 15 and in opposite end to the anchoring point 12b of the yoke 10. Optionally in preferred embodiment, the brake band 8 is anchored by two lugs 15 to two arms 17a and 17b of the yoke 10 so that each end of the brake band 8 could be anchored on different arm of the yoke 10.

The following figure will show obviously that the lugs 59 of the brake band 8 are each anchored on the different side of the yoke 10 by means of anchoring points 12a and 12b. To reach proper and sufficiently tight shrinking of the brake band 8 around the brake drum 7 at least one lug 15 of the brake band 8 is fixed to the anchoring point 12a, which is located outside (outward) the yoke 10 it means closer to the fork 4. Additionally, at least one lug 15 of the brake band 8 is fixed to anchoring point 12b, which is located inside (inward) the yoke 10 it means farther from the fork 4 toward the inner hollow space of the caster 1. All mentioned components are not shown on the FIG. 2 entirely however are visible on the other figures.

The anchoring point 12 may have a form of a projection from the yoke 10 or additionally attached pin, rivet or other convenient securing member. The caster 1 comprises a vertical axis pivot 2, a control member 3 and a fork 4 to which the caster 1 is fixed to by swivel pin 8. The body of the caster 1 comprises a brake drum 7, which is encircled by brake band 8. It means that the brake drum 7 described herein is an integral part of the caster 1, however, optionally the brake drum 7 may be fixed to the caster 1 body externally by rivets, screws, nuts or any other joining members. The FIG. 2 also shows that the fork 4 comprises an opening 16 for swivel pin 6.

Figure 3:
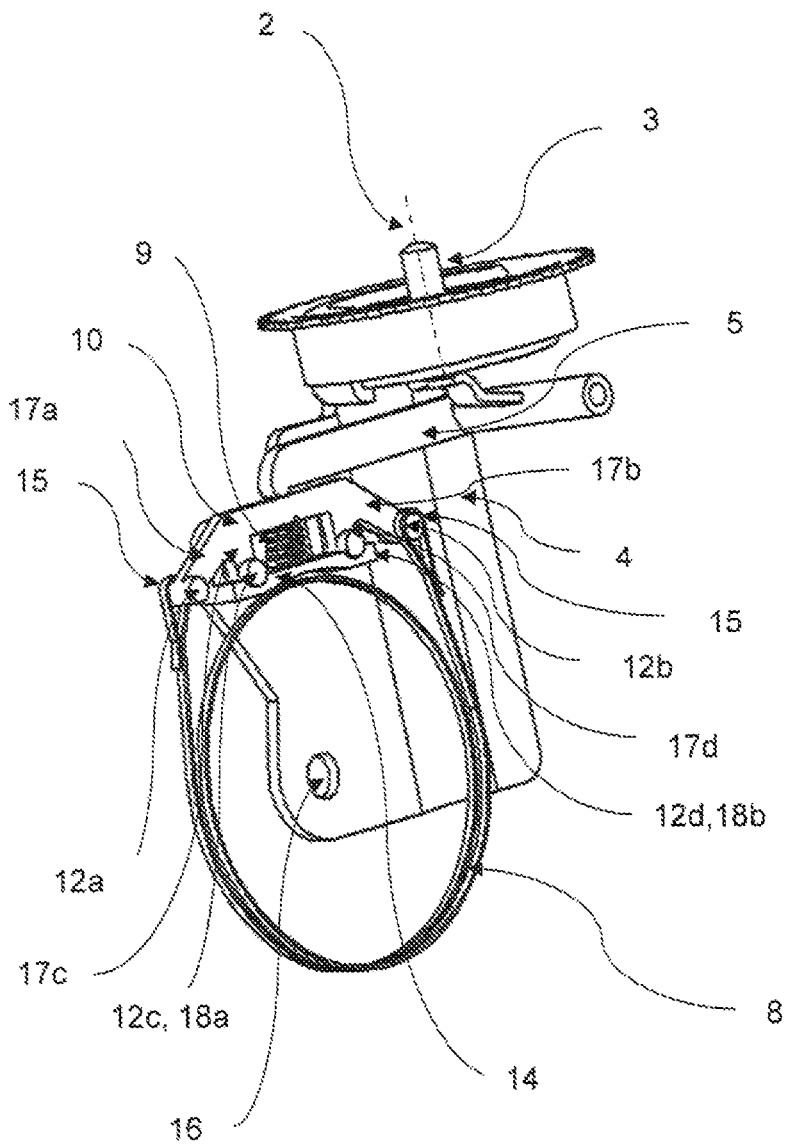
FIG. 3 shows axonometric projection of an inner arrangement of the two-way controlled band brake without the inner drum.

The FIG. 3 shows axonometric projection of the inner arrangement of the band brake system without the inner brake drum 7 and external cover of the caster 1. The FIG. 3 shows a vertical axis pivot 2, a control member 3, a fork 4 with a lever 5 which is coupled with the control member in one end and in another end the lever 5 bears on the centre of the symmetrical yoke 10. The symmetrical yoke 10 comprises anchoring points 12 on each end. In this embodiment the yoke 10 is one unit, optionally the yoke 10 may comprise four arms 17 whereas one pair of arms 17a and 17b are long arms with anchoring points 12a and 12b in the ends into which the brake band 8 is fixed by lugs 15. In addition the yoke 10 comprises also short arms 17c and 17d with anchoring points 12c and 12d, which may have function of pivots 18a and 18b if the yoke 1 is in braked position.

Anchoring of the brake band 8 is provided by lugs 15 for fixing the brake band 8, which are attached on opposite sides of the yoke 10 contrarily against each other so that the brake band A could form a spiral for braking. The lugs 15 are made by plate of the brake band 8 and have a shape of a loop. Optionally, the lugs 15 may be formed, same as the brake band 8 by metal wire or a circle on the metal wire. The brake band 8 may be made of other materials which will be resistant sufficiently for repeated braking of brake drum 7.

The yoke 10 comprises at least one anchoring point 12 in each opposite end for fixing the brake band 8. In the preferred embodiment, this anchoring point 12 on the yoke 10 has a form of a metal projection, which projects on both sides of the yoke 10 as shape T, but may be shaped differently to anchor the brake band 8 which encircles the inner brake drum 7. The brake drum 7 is not shown in the FIG. 3. The FIG. 3 shows also that the yoke 10 is one unit having four arms 17, whereas two arms 17a and 17b are long arms determined for hanging up and controlling of the brake band 8, and another two arms 17 are short arms 17c and 17d, which are determined for anchoring the yoke 10 into the guiding bar 11 of the yoke in yoke slots 18 that are not shown in this FIG. 3. The yoke Q bears on the support 14 of the yoke which is a part of the fork 4 (carrying member). All arms 17 are capacity bearing arms 17 of the yoke 12, whereas always at least two arms 17 have different function than the other two arms 17. The FIG. 3 shows that the yoke 10 bears on the support 14 by both anchoring points 12c and 12d, whereas a spring 9 is located between the yoke 10 and the support 14. The anchoring points 12c and 12d are simultaneously also pivots 18a and 18b should the yoke 10 be in braked position. The FIG. 3 shows that the lever 5 bears on the yoke 10, and in such position the brake band 8 around the brake drum 7 (not shown) is free and the caster 1 may move free. In case the lever 5 is released, which means that the lever 5 does not bear onto the yoke 10 and frees its position, the yoke 10 will change the position therewith that at least one pivot 18a or 18b moves away from the centre of the caster 1 according to which direction the caster 1 rotates to and the brake band 8 shrinks around the brake drum 7 (which is not shown in this figure). The change of position of the yoke 10 and the lever 5 enables the yoke 10 to shrink the brake band 8 around the brake drum 7 and thus stop the caster 1. Change of position of the yoke 10 depends on direction of rotation of the caster 1.

All components of the mechanical two-way controlled band brake such as lever 5, yoke 10, arms 17a, 17b, 17c, 17d of yoke, guiding bar 11 of yoke, brake band 8, anchoring points 12, pivots 18 and brake drums 7 are made of metal or metal alloys in the preferred embodiment. The above mentioned components of the mechanical two-way controlled band brake may be also made of other materials such as plastics, combination of metal alloys and plastics or any other materials which are firm with sufficient bearing capacity.

LIST OF REFERENCES 1) caster
2) vertical axis pivot
3) control member
4) fork (carrying member)
5) lever
6) swivel pin
7) brake drum
8) brake band
9) spring 10) yoke
11) guiding bar (of a yoke)
12) anchoring point (a, b, c, d)
13) yoke slot (a, b)
14) support (of a yoke and a spring)
15) lug (for fixing of brake band)
16) opening (for swivel pin of a caster)
17) arms:
    17a, 17b—long arms
    17c, 17d—short arms
18) pivot (a, b)

The invention claimed is:

1. A mechanical two-way band brake for a caster comprising:

a vertical axis pivot, a control member, a fork, and a lever that bears on a yoke at least on one end of the lever, whereas the yoke comprises at least one anchoring point on at least one arm of the yoke and is coupled to the fork, whereas the anchoring point is supported by a support of the fork and simultaneously located in a yoke slot of a guiding bar, whereas the yoke is supported free on the support of the fork and in parallel is supported by a spring, whereas in addition the yoke comprises ends and the at least one anchoring point comprises at least one anchoring point at each of the ends of the yoke to fix a brake band to the yoke, wherein the brake band encircles a brake drum of the caster in spiral.

2. The mechanical two-way band brake according to claim 1, wherein the at least one arm and the anchoring points comprise at least two bearing arms with anchoring points for fixing of the yoke and at least two bearing arms with anchoring points for fixing the brake band.

3. The mechanical two-way band brake according to claim 2 wherein the at least two anchoring points are simultaneously pivots should the yoke be in braked position.

4. The mechanical two-way band brake according to claim 1, wherein the brake band comprises lugs in each end to fix the brake band to the anchoring points of the yoke whereas the yoke is flexibly vertically movable in a body of the yoke.

5. The mechanical two-way band brake according to claim 1, wherein the brake band is metal.

6. The mechanical two-way band brake according to claim 1, wherein the brake band is made of materials selected from a group of materials consisting essentially of metal alloys, metal wire, plastics, and plastic alloys.

7. The mechanical two-way band brake according to claim 1, wherein the yoke is one unit and the at least one arm comprises four arms and the anchoring points comprise four anchoring points and the yoke is metal.

8. The mechanical two-way band brake according to claim 1, wherein the yoke is one unit and the at least one arm comprises four arms and the anchoring points comprise four anchoring points and the yoke is made of materials selected from a group of materials consisting essentially of metal alloys, metal wire, plastics, and plastic alloys.

9. A method of braking a two way band brake, the method comprising the step of:

providing a mechanical two-way band brake for a caster comprising:

a fork, and a lever that bears on a yoke at least on one end of the lever, the yoke comprising at least one anchoring point on at least one arm of the yoke and being coupled to the fork, the anchoring point being supported by a support of the fork and simultaneously located in a yoke slot of a guiding bar, the yoke being supported free on the support of the fork and in parallel being supported by a spring, the yoke further comprising ends and the at least one anchoring point comprising at least one anchoring point at each of the ends of the yoke to fix a brake band to the yoke, the brake band encircling a brake drum of the caster in spiral, and releasing the lever releases the yoke by which a position of the yoke changes and the brake band shrinks around the brake drum, whereas a change of the yoke depends on a direction of rotation of the brake drum of the caster, wherein releasing the lever bearing onto the yoke changes the position of the yoke by the spring and thus the brake band shrinks around the brake drum.

10. A method of braking a two way band brake of claim 1, the method comprising the step of:

providing a mechanical two-way band brake for a caster comprising:

a fork, and a lever that bears on a yoke at least on one end of the lever, the yoke comprising at least one anchoring point on at least one arm of the yoke and being coupled to the fork, the anchoring point being supported by a support of the fork and simultaneously located in a yoke slot of a guiding bar, the yoke being supported free on the support of the fork and in parallel being supported by a spring, the yoke further comprising ends and the at least one anchoring point comprising at least one anchoring point at each of the ends of the yoke to fix a brake band to the yoke, the brake band encircling a brake drum of the caster in spiral, and pressing the lever onto the yoke to press the spring and at least two of the anchoring points bear onto a support of the yoke, whereas the brake band releases around the brake drum and releasing of the brake drum enables free rotation of the caster.

\* \* \* \* \*